(12) United States Patent
Seo et al.

(10) Patent No.: US 7,783,159 B2
(45) Date of Patent: Aug. 24, 2010

(54) RECORDING MEDIUM HAVING DATA STRUCTURE FOR MANAGING REPRODUCTION OF MULTIPLE REPRODUCTION PATH VIDEO DATA FOR AT LEAST A SEGMENT OF A TITLE RECORDED THEREON AND RECORDING AND REPRODUCING METHODS AND APPARATUSES

(75) Inventors: Kang Soo Seo, Kyunggi-do (KR); Eun Sil Hyun, Seoul (KR); Jea Yong Yoo, Seoul (KR); Sung Wan Park, Suwon-si (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1220 days.

(21) Appl. No.: 10/458,278

(22) Filed: Jun. 11, 2003

(65) Prior Publication Data
US 2003/0235404 A1    Dec. 25, 2003

(30) Foreign Application Priority Data
Jun. 24, 2002    (KR) .................. 10-2002-0035421

(51) Int. Cl.
*H04N 7/00* (2006.01)
(52) U.S. Cl. .............................. 386/95; 386/69; 386/96; 386/125; 386/126; 382/100; 382/236
(58) Field of Classification Search .................. 386/98, 386/125–126, 111, 112, 104, 105, 46, 27, 386/95–96
See application file for complete search history.

(56) References Cited

U.S. PATENT DOCUMENTS

| | | | |
|---|---|---|---|
| 4,777,357 A | * | 10/1988 | Harada et al. .......... 235/462.27 |
| 5,521,898 A | * | 5/1996 | Ogasawara ................. 386/112 |
| 5,559,808 A | | 9/1996 | Kostreski et al. |
| 5,583,652 A | | 12/1996 | Ware |
| 5,602,956 A | | 2/1997 | Suzuki et al. |
| 5,630,006 A | | 5/1997 | Hirayama et al. |
| 5,633,839 A | | 5/1997 | Alexander et al. |
| 5,651,010 A | | 7/1997 | Kostreski et al. |
| 5,691,972 A | | 11/1997 | Tsuga et al. |
| 5,729,549 A | | 3/1998 | Kostreski et al. |
| 5,732,185 A | | 3/1998 | Hirayama et al. |

(Continued)

FOREIGN PATENT DOCUMENTS

CN    1205793    1/1993

(Continued)

OTHER PUBLICATIONS

Chinese Office Action dated Dec. 14, 2007.

(Continued)

*Primary Examiner*—Jamie J Atala
(74) *Attorney, Agent, or Firm*—Harness, Dickey & Pierce, P.L.C.

(57) ABSTRACT

The recording medium includes at least one data area storing more than one clip of video data for at least one segment of a title, and each clip of video data is associated with a different reproduction path of the segment.

33 Claims, 8 Drawing Sheets

U.S. PATENT DOCUMENTS

| | | |
|---|---|---|
| 5,734,788 A | 3/1998 | Nonomura et al. |
| 5,742,569 A | 4/1998 | Yamamoto et al. |
| 5,745,643 A | 4/1998 | Mishina |
| 5,747,136 A | 5/1998 | Shono et al. |
| 5,771,334 A | 6/1998 | Yamauchi et al. |
| 5,784,528 A * | 7/1998 | Yamane et al. .............. 386/112 |
| 5,835,493 A | 11/1998 | Magee et al. |
| 5,854,873 A | 12/1998 | Mori et al. |
| 5,870,523 A | 2/1999 | Kikuchi et al. |
| 5,877,817 A | 3/1999 | Moon |
| 5,884,004 A * | 3/1999 | Sato et al. .................... 386/98 |
| 5,907,658 A | 5/1999 | Murase et al. |
| 5,909,257 A | 6/1999 | Ohishi et al. |
| 5,913,010 A | 6/1999 | Kaneshige et al. |
| 5,917,781 A | 6/1999 | Kim |
| 5,923,869 A | 7/1999 | Kashiwagi et al. |
| 5,933,410 A | 8/1999 | Nakane et al. |
| 5,940,255 A | 8/1999 | Uwabo et al. |
| 5,949,792 A | 9/1999 | Yasuda et al. |
| 5,953,187 A | 9/1999 | Uwabo et al. |
| 5,953,290 A | 9/1999 | Fukuda et al. |
| 5,987,126 A | 11/1999 | Okuyama et al. |
| 5,999,694 A | 12/1999 | Yasuda et al. |
| 5,999,698 A | 12/1999 | Nakai et al. |
| 6,009,234 A | 12/1999 | Taira et al. |
| 6,014,495 A | 1/2000 | Moriyama et al. |
| 6,016,381 A | 1/2000 | Taira et al. |
| 6,031,962 A * | 2/2000 | Sawabe et al. ................. 386/96 |
| 6,035,095 A | 3/2000 | Kaneshige et al. |
| 6,064,385 A | 5/2000 | Sturgeon et al. |
| 6,064,796 A | 5/2000 | Nakamura et al. |
| 6,067,400 A | 5/2000 | Saeki et al. |
| 6,084,581 A | 7/2000 | Hunt |
| 6,097,676 A | 8/2000 | Fujinami |
| 6,118,927 A | 9/2000 | Kikuchi et al. |
| 6,130,869 A | 10/2000 | Tokoro et al. |
| 6,167,189 A | 12/2000 | Taira et al. |
| 6,175,681 B1 | 1/2001 | Kaneshige et al. |
| 6,181,870 B1 | 1/2001 | Okada et al. |
| 6,181,872 B1 | 1/2001 | Yamane et al. |
| 6,195,726 B1 | 2/2001 | Hogan |
| 6,215,746 B1 | 4/2001 | Ando et al. |
| 6,219,488 B1 | 4/2001 | Mori et al. |
| 6,222,805 B1 | 4/2001 | Mori et al. |
| 6,229,952 B1 | 5/2001 | Nonomura et al. |
| 6,246,402 B1 | 6/2001 | Setogawa et al. |
| 6,247,022 B1 | 6/2001 | Yankowski |
| 6,282,320 B1 | 8/2001 | Hasegawa et al. |
| 6,285,825 B1 | 9/2001 | Miwa et al. |
| 6,292,226 B1 | 9/2001 | Yamanaka et al. |
| 6,308,005 B1 | 10/2001 | Ando et al. |
| 6,308,006 B1 | 10/2001 | Yamamoto et al. |
| 6,321,027 B2 | 11/2001 | Honjo |
| 6,336,002 B1 | 1/2002 | Yamauchi et al. |
| 6,343,062 B1 | 1/2002 | Furukawa et al. |
| 6,345,147 B1 | 2/2002 | Mimura et al. |
| 6,351,442 B1 | 2/2002 | Tagawa et al. |
| 6,353,613 B1 | 3/2002 | Kubota et al. |
| 6,356,971 B1 | 3/2002 | Katz et al. |
| 6,360,055 B1 | 3/2002 | Kaneshige et al. |
| 6,373,803 B2 | 4/2002 | Ando et al. |
| 6,377,474 B1 | 4/2002 | Archambeault et al. |
| 6,377,518 B1 | 4/2002 | Auwens et al. |
| 6,377,747 B1 | 4/2002 | Murase et al. |
| 6,381,404 B1 | 4/2002 | deCarmo |
| 6,385,388 B1 | 5/2002 | Lewis et al. |
| 6,385,389 B1 | 5/2002 | Maruyama et al. |
| 6,385,394 B1 | 5/2002 | Okada et al. |
| 6,385,398 B1 | 5/2002 | Matsumoto |
| 6,392,969 B1 | 5/2002 | Heo |
| 6,393,430 B1 | 5/2002 | Van Ryzin |
| 6,393,574 B1 | 5/2002 | Kashiwagi et al. |
| 6,415,101 B1 | 7/2002 | DeCarmo et al. |
| 6,424,793 B1 | 7/2002 | Setogawa et al. |
| 6,424,797 B1 | 7/2002 | Murase et al. |
| 6,445,872 B1 | 9/2002 | Sano et al. |
| 6,470,140 B1 | 10/2002 | Sugimoto et al. |
| 6,470,460 B1 | 10/2002 | Kashiwagi et al. |
| 6,515,101 B1 | 2/2003 | Sheares |
| 6,532,334 B1 | 3/2003 | Kikuchi et al. |
| 6,546,195 B2 | 4/2003 | Kashiwagi et al. |
| 6,556,774 B2 | 4/2003 | Tsumagari et al. |
| 6,564,006 B1 | 5/2003 | Mori et al. |
| 6,567,608 B2 | 5/2003 | Mori et al. |
| 6,570,837 B1 | 5/2003 | Kikuchi et al. |
| 6,573,819 B1 | 6/2003 | Oshima et al. |
| 6,580,870 B1 | 6/2003 | Kanazawa et al. |
| 6,584,277 B2 | 6/2003 | Tsumagari et al. |
| 6,603,517 B1 | 8/2003 | Shen et al. |
| 6,615,192 B1 | 9/2003 | Tagawa et al. |
| 6,618,396 B1 | 9/2003 | Kondo et al. |
| 6,643,450 B1 | 11/2003 | DeCarmo |
| 6,647,496 B1 | 11/2003 | Tagawa et al. |
| 6,654,543 B2 | 11/2003 | Ando et al. |
| 6,700,839 B1 | 3/2004 | Auflick et al. |
| 6,727,421 B2 | 4/2004 | Izawa et al. |
| 6,763,345 B1 | 7/2004 | Hempleman et al. |
| 6,766,103 B2 | 7/2004 | Kim et al. |
| 6,782,192 B1 | 8/2004 | Tanaka et al. |
| 6,788,883 B1 | 9/2004 | Park et al. |
| 6,795,499 B1 | 9/2004 | Kato et al. |
| 6,798,981 B1 | 9/2004 | Yamauchi et al. |
| 6,801,713 B1 | 10/2004 | Yagawa et al. |
| 6,832,293 B1 | 12/2004 | Tagawa et al. |
| 6,859,421 B2 | 2/2005 | Sawabe et al. |
| 6,901,078 B2 | 5/2005 | Morris |
| 6,904,227 B1 | 6/2005 | Yamamoto et al. |
| 6,912,218 B1 | 6/2005 | Jeon |
| 6,914,863 B2 | 7/2005 | Ono |
| 6,965,727 B1 | 11/2005 | Sawabe et al. |
| 6,999,674 B1 | 2/2006 | Hamada et al. |
| 7,006,758 B1 | 2/2006 | Yamamoto et al. |
| 7,024,102 B1 | 4/2006 | Inoshita et al. |
| 7,050,384 B2 | 5/2006 | Sasaki |
| 7,065,287 B1 | 6/2006 | Heredia et al. |
| 7,072,573 B2 | 7/2006 | Okada et al. |
| 7,106,946 B1 * | 9/2006 | Kato ........................... 386/69 |
| 7,113,694 B2 | 9/2006 | Kim et al. |
| 7,124,303 B2 | 10/2006 | Candelore et al. |
| 7,236,687 B2 * | 6/2007 | Kato et al. .................... 386/95 |
| 7,477,833 B2 * | 1/2009 | Kato et al. ................... 386/125 |
| 7,565,060 B2 | 7/2009 | Hamada et al. |
| 2001/0014070 A1 | 8/2001 | Ando et al. |
| 2001/0026679 A1 | 10/2001 | Koshino et al. |
| 2001/0030710 A1 | 10/2001 | Werner |
| 2001/0033517 A1 | 10/2001 | Ando et al. |
| 2001/0036358 A1 | 11/2001 | Kim et al. |
| 2001/0038745 A1 | 11/2001 | Sugimoto et al. |
| 2001/0043790 A1 | 11/2001 | Saeki et al. |
| 2001/0053280 A1 | 12/2001 | Yamauchi et al. |
| 2002/0001385 A1 | 1/2002 | Kawada et al. |
| 2002/0015383 A1 | 2/2002 | Ueno |
| 2002/0015581 A1 | 2/2002 | Ando et al. |
| 2002/0018416 A1 | 2/2002 | Heo |
| 2002/0021761 A1 | 2/2002 | Zhang et al. |
| 2002/0031336 A1 | 3/2002 | Okada et al. |
| 2002/0041557 A1 | 4/2002 | Heo |
| 2002/0046328 A1 | 4/2002 | Okada |
| 2002/0076201 A1 | 6/2002 | Tsumagari et al. |
| 2002/0093556 A1 | 7/2002 | Ishizawa et al. |
| 2002/0093886 A1 | 7/2002 | Ijichi et al. |
| 2002/0097981 A1 | 7/2002 | Seo et al. |
| 2002/0097984 A1 * | 7/2002 | Abecassis ..................... 386/70 |
| 2002/0106196 A1 | 8/2002 | Yamauchi et al. |

| | | | | | |
|---|---|---|---|---|---|
| 2002/0114614 A1 | 8/2002 | Nakatani et al. | CN | 1346491 | 4/2002 |
| 2002/0126994 A1 | 9/2002 | Gunji et al. | CN | 1364387 | 8/2002 |
| 2002/0127002 A1 | 9/2002 | Mori et al. | CN | 1383679 | 12/2002 |
| 2002/0129036 A1 | 9/2002 | Ho Yuen Lok et al. | CN | 1393872 | 1/2003 |
| 2002/0131767 A1 | 9/2002 | Auwens et al. | CN | 1251461 | 4/2004 |
| 2002/0135607 A1 | 9/2002 | Kato et al. | CN | 1237852 | 5/2004 |
| 2002/0135608 A1 | 9/2002 | Hamada et al. | CN | 1509572 | 6/2004 |
| 2002/0145702 A1 | 10/2002 | Kato et al. | CN | 1263345 | 9/2004 |
| 2002/0150383 A1 | 10/2002 | Kato et al. | CN | 1555058 | 12/2004 |
| 2002/0159368 A1 | 10/2002 | Noda et al. | CN | 1571055 | 1/2005 |
| 2002/0177914 A1 | 11/2002 | Chase | CN | 1606355 | 4/2005 |
| 2002/0180803 A1 | 12/2002 | Kaplan et al. | CN | 1606356 | 4/2005 |
| 2002/0196365 A1 | 12/2002 | Cho et al. | CN | 1606357 | 4/2005 |
| 2002/0197059 A1 | 12/2002 | Cho et al. | CN | 1611071 | 4/2005 |
| 2003/0002194 A1 | 1/2003 | Andoh | EP | 0 677 842 | 10/1995 |
| 2003/0007780 A1 | 1/2003 | Senoh | EP | 0724264 | 7/1996 |
| 2003/0026597 A1 | 2/2003 | Cho et al. | EP | 0723216 | 9/1996 |
| 2003/0035681 A1 | 2/2003 | Ho | EP | 0737009 | 10/1996 |
| 2003/0046638 A1 | 3/2003 | Thompson | EP | 0737980 | 4/1997 |
| 2003/0058948 A1 | 3/2003 | Kelly et al. | EP | 0831647 | 3/1998 |
| 2003/0103604 A1 | 6/2003 | Kato et al. | EP | 0847198 | 3/1998 |
| 2003/0118327 A1 | 6/2003 | Um et al. | EP | 0836189 | 4/1998 |
| 2003/0123346 A1 | 7/2003 | Ishii et al. | EP | 0836183 | 8/1998 |
| 2003/0123845 A1 | 7/2003 | Koda et al. | EP | 0858073 | 8/1998 |
| 2003/0123849 A1 | 7/2003 | Nallur et al. | EP | 0872839 | 10/1998 |
| 2003/0133509 A1 | 7/2003 | Yanagihara et al. | EP | 0 911 825 | 4/1999 |
| 2003/0147322 A1 | 8/2003 | Ono | EP | 0 917 149 | 5/1999 |
| 2003/0161615 A1 | 8/2003 | Tsumagari et al. | EP | 0917355 | 5/1999 |
| 2003/0221055 A1 | 11/2003 | Okada | EP | 0918438 | 6/1999 |
| 2003/0235403 A1 | 12/2003 | Seo et al. | EP | 0920203 | 6/1999 |
| 2003/0235404 A1 | 12/2003 | Seo et al. | EP | 0929072 | 7/1999 |
| 2004/0014136 A1 | 1/2004 | Ishii et al. | EP | 0873022 | 10/1999 |
| 2004/0019396 A1 | 1/2004 | McMahon et al. | EP | 1024494 | 8/2000 |
| 2004/0047588 A1 | 3/2004 | Okada et al. | EP | 0940983 | 10/2000 |
| 2004/0047591 A1 | 3/2004 | Seo et al. | EP | 1050880 | 11/2000 |
| 2004/0047923 A1 | 3/2004 | Turpen et al. | EP | 1103974 | 5/2001 |
| 2004/0076402 A1 | 4/2004 | Jung et al. | EP | 1126454 A1 | 8/2001 |
| 2004/0086261 A1 | 5/2004 | Hanes | EP | 1041565 | 9/2001 |
| 2004/0114908 A1 | 6/2004 | Ito | EP | 1148503 | 10/2001 |
| 2004/0156621 A1 | 8/2004 | Seo et al. | EP | 1041569 | 1/2002 |
| 2004/0179819 A1 | 9/2004 | Cho et al. | EP | 1 198 132 | 4/2002 |
| 2004/0179820 A1 | 9/2004 | Kashiwagi et al. | EP | 1198132 | 4/2002 |
| 2004/0179823 A1 | 9/2004 | Jung et al. | EP | 1198133 | 4/2002 |
| 2004/0179827 A1 | 9/2004 | Cho et al. | EP | 1 205 933 A2 | 5/2002 |
| 2004/0208135 A1 | 10/2004 | Nakamura et al. | EP | 1202568 | 7/2002 |
| 2004/0213105 A1 | 10/2004 | Seo et al. | EP | 1 271 526 | 1/2003 |
| 2004/0220791 A1 | 11/2004 | Lamkin et al. | EP | 1280348 | 1/2003 |
| 2004/0247290 A1 | 12/2004 | Seo et al. | EP | 1286544 | 2/2003 |
| 2004/0252975 A1 | 12/2004 | Cho et al. | EP | 1391119 | 2/2004 |
| 2005/0019007 A1 | 1/2005 | Kato et al. | EP | 1398965 | 3/2004 |
| 2005/0025459 A1* | 2/2005 | Kato et al. ............ 386/95 | EP | 1469677 | 10/2004 |
| 2005/0036763 A1* | 2/2005 | Kato et al. ............ 386/69 | EP | 1081885 | 3/2005 |
| 2005/0063671 A1 | 3/2005 | Jung et al. | EP | 1521463 | 4/2005 |
| 2005/0063672 A1 | 3/2005 | Jung et al. | EP | 0949622 | 12/2006 |
| 2005/0232111 A1 | 10/2005 | Sawabe et al. | JP | 2003-233952 A | 0/2003 |
| 2006/0013564 A1 | 1/2006 | Hamada et al. | JP | 01-003781 | 1/1989 |
| 2006/0110132 A1 | 5/2006 | Takakuwa et al. | JP | 01-116819 | 5/1989 |
| 2006/0222340 A1* | 10/2006 | Yamauchi et al. ........ 386/95 | JP | 64-003781 | 7/1990 |
| 2007/0047923 A1 | 3/2007 | Eklund et al. | JP | 08-088832 | 4/1996 |
| 2008/0019672 A1 | 1/2008 | Hamasaka et al. | JP | 08-235833 | 9/1996 |
| 2008/0253742 A1 | 10/2008 | Hamada et al. | JP | 8-273304 | 10/1996 |
| 2009/0180757 A1 | 7/2009 | De Haan | JP | 09-023403 | 1/1997 |
| | | | JP | 09-135421 | 5/1997 |
| | FOREIGN PATENT DOCUMENTS | | JP | 09-251759 | 9/1997 |
| | | | JP | 10-032780 | 2/1998 |
| CN | 1134583 | 10/1996 | JP | 10-040667 | 2/1998 |
| CN | 1212427 | 3/1999 | JP | 10-051737 | 2/1998 |
| CN | 1220458 | 6/1999 | JP | 2000-195235 | 3/1998 |
| CN | 1239574 | 12/1999 | JP | 10-269698 | 10/1998 |
| CN | 1272209 | 11/2000 | JP | 10-271449 | 10/1998 |
| CN | 1310445 | 8/2001 | JP | 10-299698 | 11/1998 |
| CN | 1320926 | 11/2001 | JP | 11-041563 | 2/1999 |
| CN | 1321319 A | 11/2001 | JP | 11-069308 | 3/1999 |

| | | | | | | |
|---|---|---|---|---|---|---|
| JP | 11-069309 | 3/1999 | | JP | 2005-251392 | 9/2005 |
| JP | 11-096653 | 4/1999 | | KR | 1996-0038743 | 11/1996 |
| JP | 11-103444 | 4/1999 | | KR | 1996-0038744 | 11/1996 |
| JP | 11-120747 | 4/1999 | | KR | 1996-0038901 | 11/1996 |
| JP | 11-134812 | 5/1999 | | KR | 1996-0038905 | 11/1996 |
| JP | 11-161663 | 6/1999 | | KR | 10-1999-0022858 | 10/1997 |
| JP | 11-185463 | 7/1999 | | KR | 1999-0079482 | 11/1999 |
| JP | 11-213522 | 8/1999 | | KR | 10-2000-0031861 | 6/2000 |
| JP | 11-213627 | 8/1999 | | KR | 2000-053633 | 8/2000 |
| JP | 11-259976 | 9/1999 | | KR | 10-2000-0055028 | 9/2000 |
| JP | 11-259985 | 9/1999 | | KR | 10-2000-0056179 | 9/2000 |
| JP | 11-296997 | 10/1999 | | KR | 10-2000-0065876 | 11/2000 |
| JP | 11-346341 | 12/1999 | | KR | 2001-0022702 A | 3/2001 |
| JP | 2000-01130 | 1/2000 | | KR | 10-0294884 | 4/2001 |
| JP | 2000-021130 | 1/2000 | | KR | 2001-0028735 | 4/2001 |
| JP | 2000-030414 | 1/2000 | | KR | 2001-051898 | 6/2001 |
| JP | 2000-041066 | 2/2000 | | KR | 10-2001-0098007 | 11/2001 |
| JP | 2000-067522 | 3/2000 | | KR | 10-2001-0098101 | 11/2001 |
| JP | 2000-069437 | 3/2000 | | KR | 10-2001-0107578 | 12/2001 |
| JP | 2000-113602 | 4/2000 | | KR | 10-2002-0006674 | 1/2002 |
| JP | 2000-149405 | 5/2000 | | KR | 2002-0006273 | 1/2002 |
| JP | 2000-149514 | 5/2000 | | KR | 2002-0020919 A | 3/2002 |
| JP | 2000-222822 | 8/2000 | | KR | 10-2002-0097454 | 12/2002 |
| JP | 2000-235779 A | 8/2000 | | KR | 10-2002-0097455 | 12/2002 |
| JP | 2000-235780 A | 8/2000 | | KR | 10-2004-0000290 | 1/2004 |
| JP | 2000-236496 | 8/2000 | | KR | 10-2004-0030992 | 4/2004 |
| JP | 2000-293938 | 10/2000 | | KR | 10-2004-0030994 | 4/2004 |
| JP | 2000-299836 | 10/2000 | | KR | 10-2004-0030995 | 4/2004 |
| JP | 2000-322827 | 11/2000 | | KR | 10-2004-0041581 | 5/2004 |
| JP | 2000-322875 | 11/2000 | | RU | 2 229 174 C2 | 5/2004 |
| JP | 2000-331466 | 11/2000 | | TW | 391548 | 5/2000 |
| JP | 2000-348442 | 12/2000 | | WO | WO 97/06531 | 2/1997 |
| JP | 2000-348467 | 12/2000 | | WO | WO 97/13361 | 4/1997 |
| JP | 2001-024985 | 1/2001 | | WO | WO97/13363 | 4/1997 |
| JP | 2001-067802 | 3/2001 | | WO | WO 97/13364 | 4/1997 |
| JP | 2001-111929 | 4/2001 | | WO | WO 97/13365 | 4/1997 |
| JP | 2001-111960 | 4/2001 | | WO | WO 97/13366 | 4/1997 |
| JP | 2001-157145 | 6/2001 | | WO | WO 97/14151 | 4/1997 |
| JP | 2001-157208 | 6/2001 | | WO | WO 97/15924 | 5/1997 |
| JP | 2001-169246 A | 6/2001 | | WO | WO 97/37491 | 10/1997 |
| JP | 3199243 | 6/2001 | | WO | WO 97/38527 | 10/1997 |
| JP | 2001-195809 | 7/2001 | | WO | WO 97/39451 | 10/1997 |
| JP | 2001-297535 | 10/2001 | | WO | WO 98/00952 | 1/1998 |
| JP | 2001-332006 | 11/2001 | | WO | WO 98/09290 | 3/1998 |
| JP | 2001-359072 | 12/2001 | | WO | WO 99/08281 | 2/1999 |
| JP | 2002-025231 A | 1/2002 | | WO | WO 99/34601 | 7/1999 |
| JP | 2002-056651 | 2/2002 | | WO | WO 99/38169 | 7/1999 |
| JP | 2002-082838 | 3/2002 | | WO | WO 00/02195 | 1/2000 |
| JP | 2002-083486 | 3/2002 | | WO | WO 00/05883 | 2/2000 |
| JP | 2002-084488 | 3/2002 | | WO | WO 00/42515 | 7/2000 |
| JP | 2002-112179 | 4/2002 | | WO | WO 00/46803 | 8/2000 |
| JP | 2002-112201 | 4/2002 | | WO | WO 00/60597 | 10/2000 |
| JP | 2002-150685 A | 5/2002 | | WO | WO 00/62295 | 10/2000 |
| JP | 2002-157838 | 5/2002 | | WO | WO 01/35648 | 5/2001 |
| JP | 2002-157859 A | 5/2002 | | WO | WO 01/35650 | 5/2001 |
| JP | 2002-158972 | 5/2002 | | WO | WO 01/52554 | 7/2001 |
| JP | 2002-158974 | 5/2002 | | WO | WO 01/82604 | 11/2001 |
| JP | 2002-216460 | 8/2002 | | WO | WO 01/82606 | 11/2001 |
| JP | 2002-222581 | 8/2002 | | WO | WO 01/82608 | 11/2001 |
| JP | 2002-288942 | 10/2002 | | WO | WO 01/82609 | 11/2001 |
| JP | 2002-352515 | 12/2002 | | WO | WO 01/82611 | 11/2001 |
| JP | 2003-006979 A | 1/2003 | | WO | WP 01/82610 | 11/2001 |
| JP | 3392838 | 1/2003 | | WO | WO 02/075739 A1 | 9/2002 |
| JP | 3392849 | 1/2003 | | WO | WO 02/079902 | 10/2002 |
| JP | 2003-059241 | 2/2003 | | WO | WO 02/080541 | 10/2002 |
| JP | 2003-068057 | 3/2003 | | WO | WO 03/047261 | 6/2003 |
| JP | 2003-087744 | 3/2003 | | WO | WO 03/058957 | 7/2003 |
| JP | 2003-116100 | 4/2003 | | WO | WO 2004/001728 | 12/2003 |
| JP | 2003-199047 | 7/2003 | | WO | WO 2004/001749 | 12/2003 |
| JP | 2003-520514 | 7/2003 | | WO | WO 2004/001750 | 12/2003 |
| JP | 3379961 | 12/2003 | | WO | WO 2004/001752 | 12/2003 |
| JP | 2004-127397 | 4/2004 | | WO | WO 2004/001753 | 12/2003 |
| JP | 2005-513936 | 5/2005 | | WO | WO 2004/001754 | 12/2003 |

| WO | WO 2004/032142 | 4/2004 |
| WO | WO 2004/047100 | 6/2004 |
| WO | WO 2004-075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |
| WO | WO 2004/088661 | 10/2004 |
| WO | WO 2004/098183 | 11/2004 |

OTHER PUBLICATIONS

European Search Report dated Dec. 28, 2007.
European Search Report dated Jan. 2, 2008.
United States Office Action dated Jan. 2, 2008.
United States Office Action dated Jan. 28, 2008.
Japanese Office Action dated Jan. 2, 2008.
Office Action dated May 7, 2008 for counterpart Japanese Application No. 2004-515199.
Office Action dated May 7, 2008 for counterpart Japanese Application No. 2004-515216.
Office Action dated May 7, 2008 for counterpart Japanese Application No. 2004-515203.
Office Action for corresponding Japanese application dated May 20, 2008.
Office Action for corresponding Russian Application dated May 10, 2007.
Chinese Office Action corresponding to Chinese Application No. 200480009338.8 dated Sep. 5, 2008.
Japanese Office Action Corresponding to Japanese Application No. 2004-515203 dated Nov. 18, 2008.
Australian Office Action corresponding to Australian Application No. 2003241203 dated Oct. 27, 2008.
Russian Notice of Allowance corresponding to Russian Application No. 2005126860/28 dated Jan. 29, 2009.
Russian Notice of Allowance corresponding to Russian Application No. 2005126865/28 dated Jan. 29, 2009.
Office Action for corresponding Japanese Application No. 2004-515201 dated Mar. 3, 2009.
Search Report for corresponding European Application No. 04708081.7 dated Sep. 12, 2008.
Japanese Office Action dated Sep. 16, 2008 corresponding to Japanese Application No. 2004-553264.
Australian Office Action dated Sep. 11, 2008 corresponding to Australian Application No. 2003240036.
Australian Office Action dated Sep. 17, 2008 corresponding to Australian Application No. 2003228113.
Hisashi Yamada, "DVD Overview," Storage Media Business Group, Toshida Corporation, IEEE, 1997.
Hideki Mimura, "DVD-Video Format," Multimedia Engineering Lab, Toshida Corporation, IEEE, 1997.
Search Report for corresponding European Application No. 03730899.6 dated Jun. 16, 2009.
Search Report for corresponding European Application No. 03730901.0 dated Jun. 19, 2009.
Office Action for Japanese Application No. 2004-515202 dated Jul. 28, 2009.
Office Action for European Application No. 03772918.3 Dated Aug. 12, 2009.
Office Action for European Application No. 03772919.1 Dated Aug. 12, 2009.
European Search Report dated Nov. 12, 2009 issued in correponding Application No. EP 04714511.5.
U.S. Notice of Allowance dated Dec. 7, 2009 issued in corresponding U.S. Appl. No. 10/462,712.
Supplementary Partial European Search Report dated Aug. 12, 2009 issued in corresponding Application No. EP 03772920.
U.S. Office Action mailed Sep. 15, 2009 issued in corresponding U.S. Appl. No. 10/715,462.
Japanese Office Action dated Feb. 5, 2010 for Japanese Patent Application No. 2008-314833 (with English Translation).

* cited by examiner

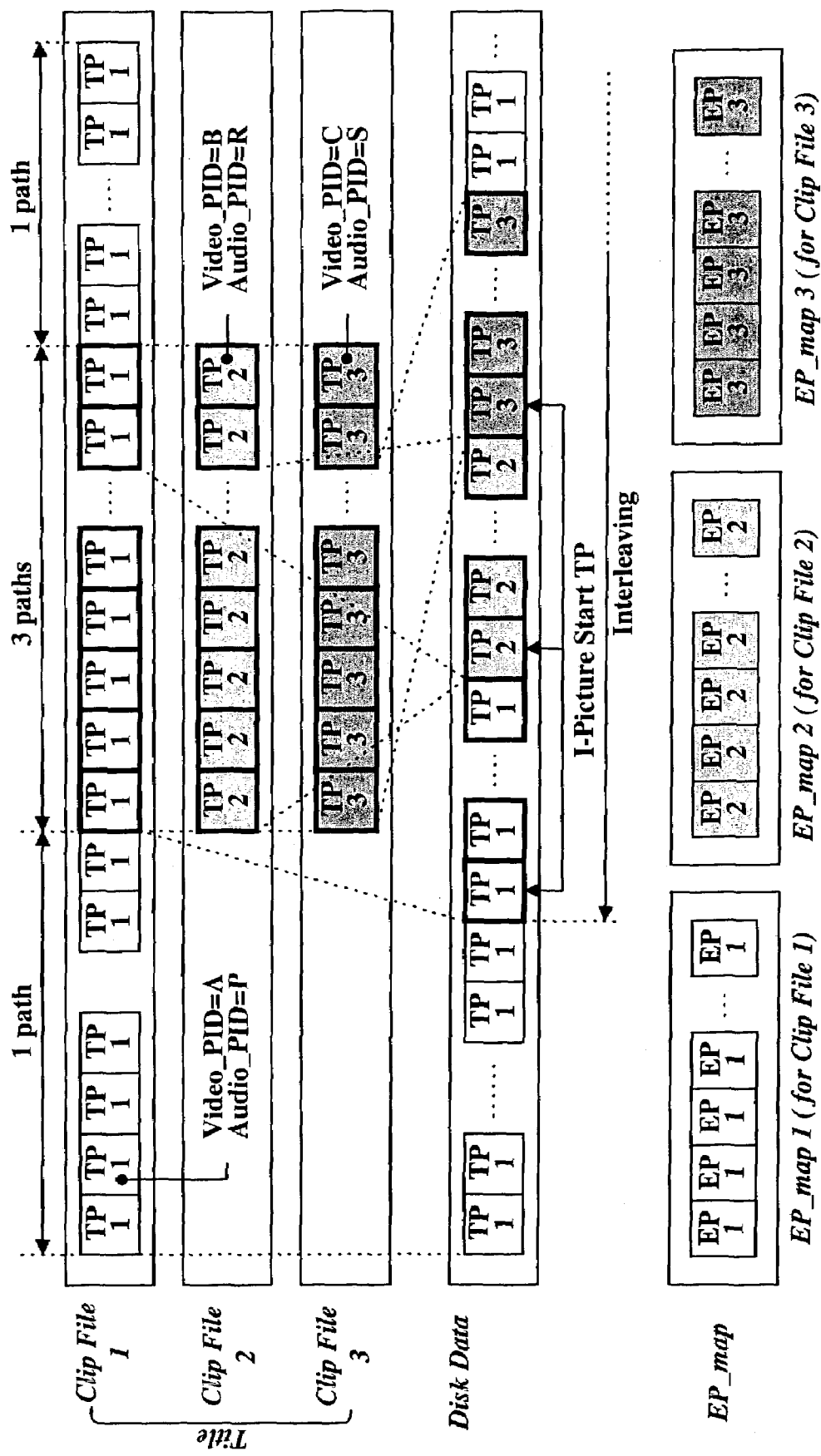

FIG. 5

*info.dvp - syntax*

| info.dvp { |
|---|
| version_number |
| TableOfPlayLists_start_address |
| reserved_for_future_use |
| ⋮ |
| TableOfPlayLists(){ |
|    length |
|    number_of_PlayLists |
|    for(I=0; i<number_of_PlayLists; i++){ |
|       PlayList_file_name |
|       path_number |
|       ............ |
|    } |
| } |
| ⋮ |

FIG. 6

*\*.rpls - syntax*

| xxxxx.rpls { |
|---|
| version_number |
| .......... |
| PlayList(){ |
|    length |
|    .......... |
|    number_of_PlayItems |
|    for(i=0; i<number_of_Playitems; i++){ |
|       PlayItem() |
| ⋮ |

| PlayItem(){ |
|---|
| length |
| ..... |
| path_number |
| ..... |

RECORDING MEDIUM HAVING DATA STRUCTURE FOR MANAGING REPRODUCTION OF MULTIPLE REPRODUCTION PATH VIDEO DATA FOR AT LEAST A SEGMENT OF A TITLE RECORDED THEREON AND RECORDING AND REPRODUCING METHODS AND APPARATUSES

BACKGROUND OF THE INVENTION

1. Field of the Invention

The present invention relates to a recording medium having a data structure for managing reproduction of at least multiple reproduction path video data recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RW) is one example of these new optical disks.

FIG. 1 illustrates the file structure of the BD-RW. The file structure or data structure provides for managing the reproduction of the video and audio data recorded on the BD-RW. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RW data structure and disk format as illustrated in FIG. 1 is well-known and readily available, only a brief overview of the file structure will be provided in this disclosure.

As alluded to above, the STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the files names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing reproduction of video and audio data recorded on the high-density read-only optical disk such as a BD-ROM is not yet available.

SUMMARY OF THE INVENTION

The recording medium according to the present invention includes a data structure for managing reproduction of at least multiple reproduction path video data recorded on the recording medium.

According to one exemplary embodiment, the recording medium includes at least one data area storing more than one clip of video data for at least one segment of a title, and each clip of video data is associated with a different reproduction path of the segment. For example, in one embodiment, each reproduction path is a different camera angle for the segment.

According to another exemplary embodiment of the present invention, the recording medium further includes a clip information directory area having at least one entry point map associated with each reproduction path in the segment. Each entry point map identifies the video data for the associated reproduction path and identifies a presentation time of the identified video data. In this exemplary embodiment, the entry point maps may be aligned in time.

According to still another exemplary embodiment of the present invention, the recording medium further includes a clip information directory area having a single entry point map identifying at least the video data in the segment. The entry point map identifies a presentation time of the identified video data.

According to a further exemplary embodiment of the present invention, the recording medium further includes a path management area storing path management information. The path management information identifies clips of video data associated with each reproduction path of at least the segment.

According to a still further exemplary embodiment, the recording medium includes at least one data area storing video data packets for at least one segment of a title. The video data packets are associated with different reproduction paths for the segment and the video data packets associated with each reproduction path for the segment are recorded as one group. In the data area the recorded groups are multiplexed.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which:

FIG. 4A illustrate a first detailed embodiment of the clip files, disk data and EP map for use in the data structure according to FIG. 2;

FIGS. 5 and 6 illustrate first and second embodiments of the data structure for reproduction path management information for use in the data structure according to FIG. 2;

DESCRIPTION OF THE PREFERRED EMBODIMENTS

In order that the invention may be fully understood, preferred embodiments thereof will now be described with reference to the accompanying drawings.

Figure 1:
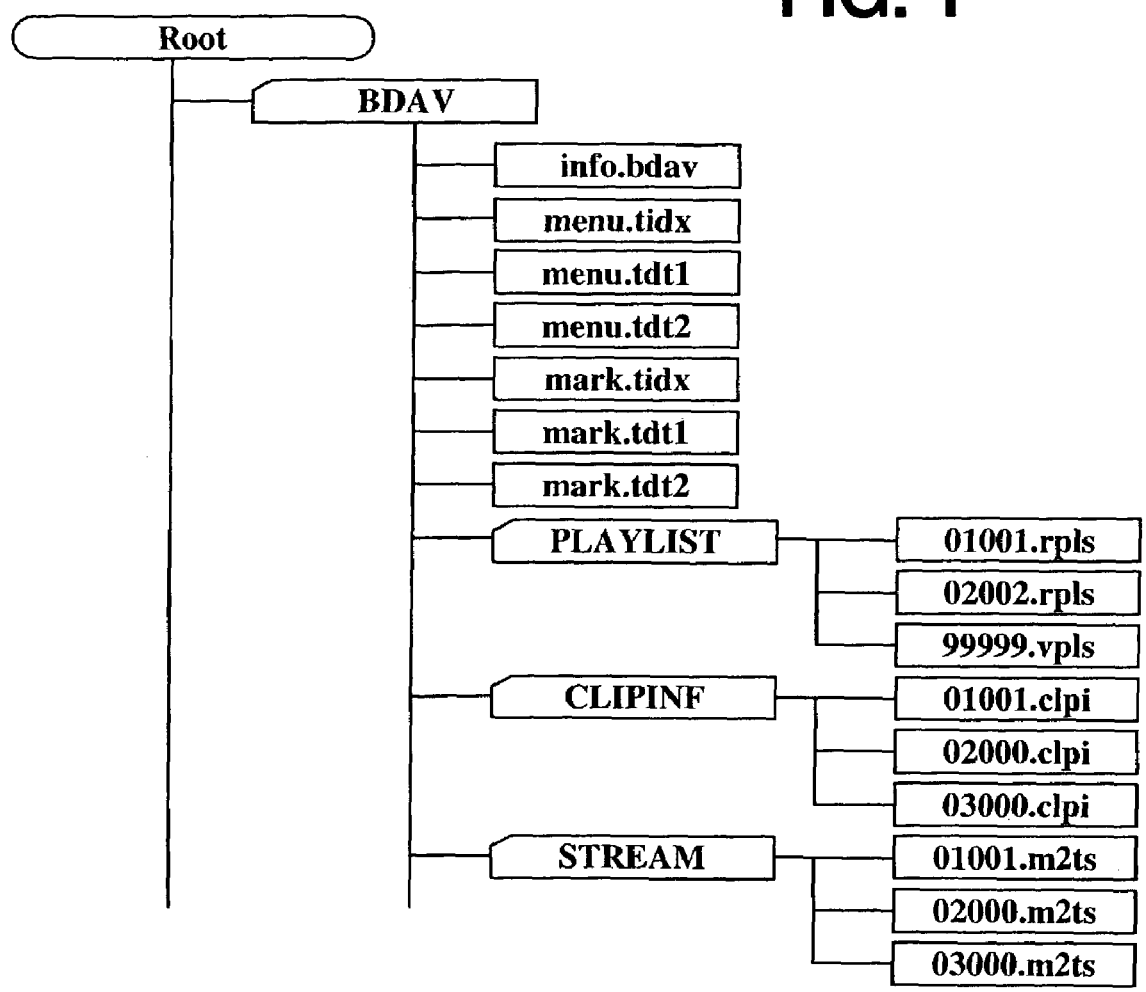
FIG. 1 illustrates the prior art file or data structure of a rewritable optical disk according to the Blu-ray Disc Rewritable (BD-RW) standard.
Figure 2:
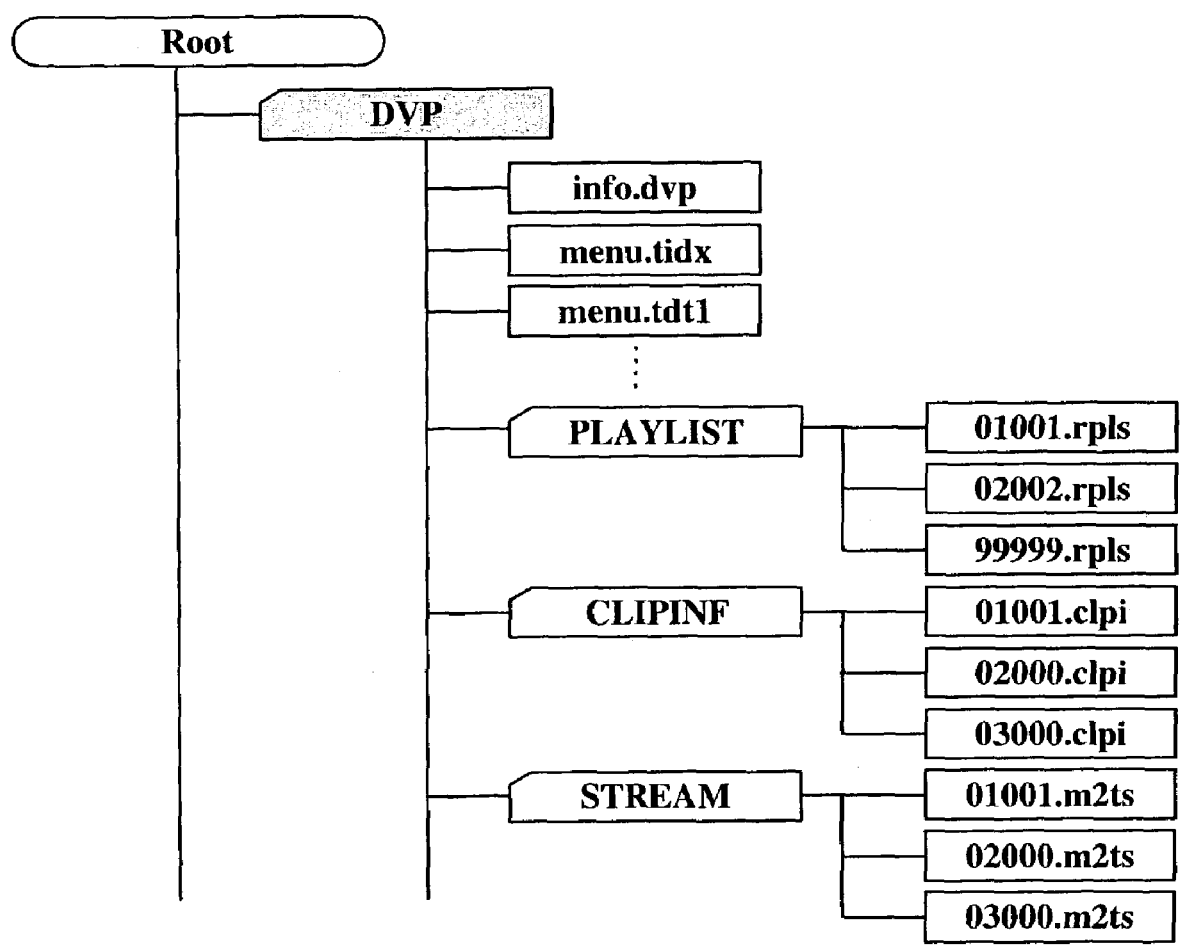
FIG. 2 illustrates an exemplary embodiment of a recording medium file or data structure according to the present invention.

A high-density optical disk, for example, a Blu-Ray ROM (BD-ROM) in accordance with the invention may have a file or data structure for managing reproduction of video and audio data as shown in FIG. 2. Many aspects of the data structure according to the present invention shown in FIG. 2 are similar to that of the BD-RW standard discussed with respect to FIG. 1. As such these aspects will not be described in great detail.

As shown in FIG. 2, the root directory contains at least one DVP directory. The DVP directory includes a general information file info.dvp, menu files menu.tidx, menu.tdt1 among others, a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.dvp file is a general information file that provides general information for managing the reproduction of the A/V streams recorded on the optical disk. More specifically, the info.dvp file includes, among other things, a table of playlists that identifies the file names of the playlists in the PLAYLIST directory. The info.dvp file will be discussed in greater detail below with respect to the embodiments of the present invention.

Figure 3:
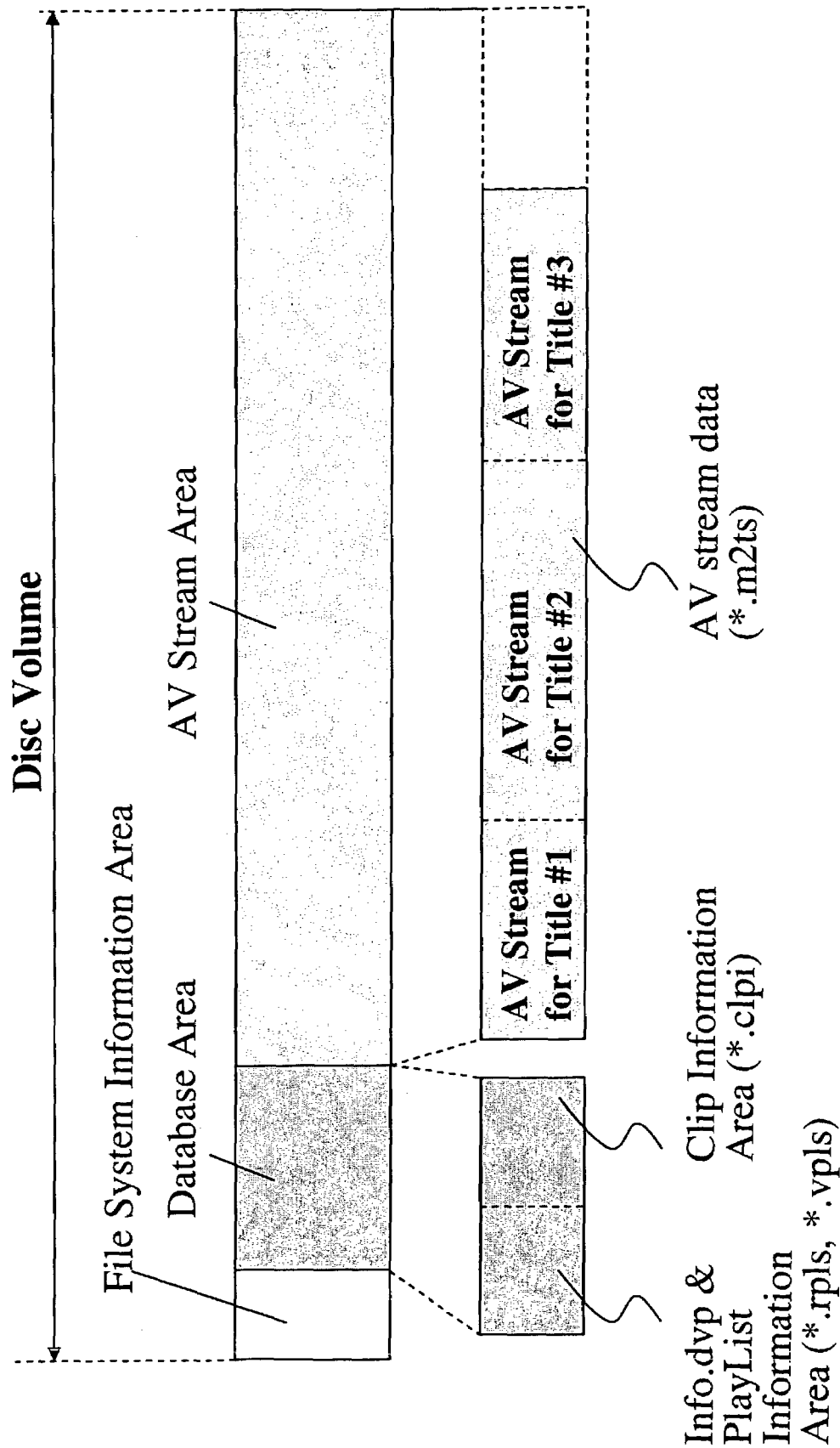
FIG. 3 illustrates an example of a recording medium having the data structure of FIG. 2 stored thereon.

In addition to illustrating the data structure of the recording medium according to an embodiment of the present invention, FIG. 2 represents the areas of the recording medium. For example, the general information file is recorded in one or more general information areas, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area. The data base area includes a general information file and playlist information area and a clip information area. The general information file and playlist information area have the general information file recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version represents a different reproduction path, and the video data in these instances is referred to as multiple reproduction path video data. It will be appreciated that the above examples of multiple reproduction path video data are not limiting, and the present invention is applicable to any type or combination of types of multiple reproduction path video data. As will be described in detail below with respect to embodiments of the present invention, the data structures according to the present invention include path management information and/or navigation information for managing reproduction of multiple reproduction path video data recorded on the recording medium.

A multiple reproduction path data stream, for instance, a multi-story, a multi-parental-level, or a multi-angle data stream recorded as a title in a physical data recording area of a recording medium (e.g., a BD-ROM) may be managed as a plurality of clip files. For example, clip files 1-3 shown in FIG. 4A correspond to a title and the A/V streams recorded in the clip files are in the form of MPEG2-formatted transport packets (TPs).

The TPs of the multi-path data stream contain packet IDs (PIDs) unique to each of the paths (e.g., different camera angles) for identifying the path. The TPs (TP1) of clip file 1 corresponding to path 1 include the information that Video_PID=A and Audio_PID=P and the TPs (TP2) of clip file 2 corresponding to path 2 include the information that Video_PID=B and Audio_PID=R. Likewise, the TPs (TP3) of clip file 3 10 corresponding to path 3 include the information that Video_PID=C and Audio_PID=S.

The TPs of the clip files 1, 2, and 3 corresponding to paths 1, 2, and 3 respectively are recorded in the AV stream area within the physical data recording area of, for example, the BD-ROM in an interleaved manner. The TPs for the multiple reproduction paths are interleaved on a PID basis as interleave blocks, each of which contains at least one I-picture. And, the first transport packet of each interleave block is the first transport packet of an I-picture.

Clip information files 1, 2, and 3 corresponding to clip files 1, 2, and 3, respectively include search information for selectively accessing TPs of each reproduction path. For example, as shown in FIG. 4A, each clip information file includes one or more entry point (EP) maps containing the presentation time stamps (PTSs) mapping to source packet numbers (SPNs) of the TPs in an associated clip file. In one exemplary embodiment, a one-to-one relationship exists between the EP maps and the number of paths included in the multiple reproduction path data stream. In the example of FIG. 4A, three EP maps 1, 2, 3 corresponding to the clip files 1, 2, and 3, respectively, are created and recorded in the corresponding clip information files 1, 2, and 3.

Figure 4B:
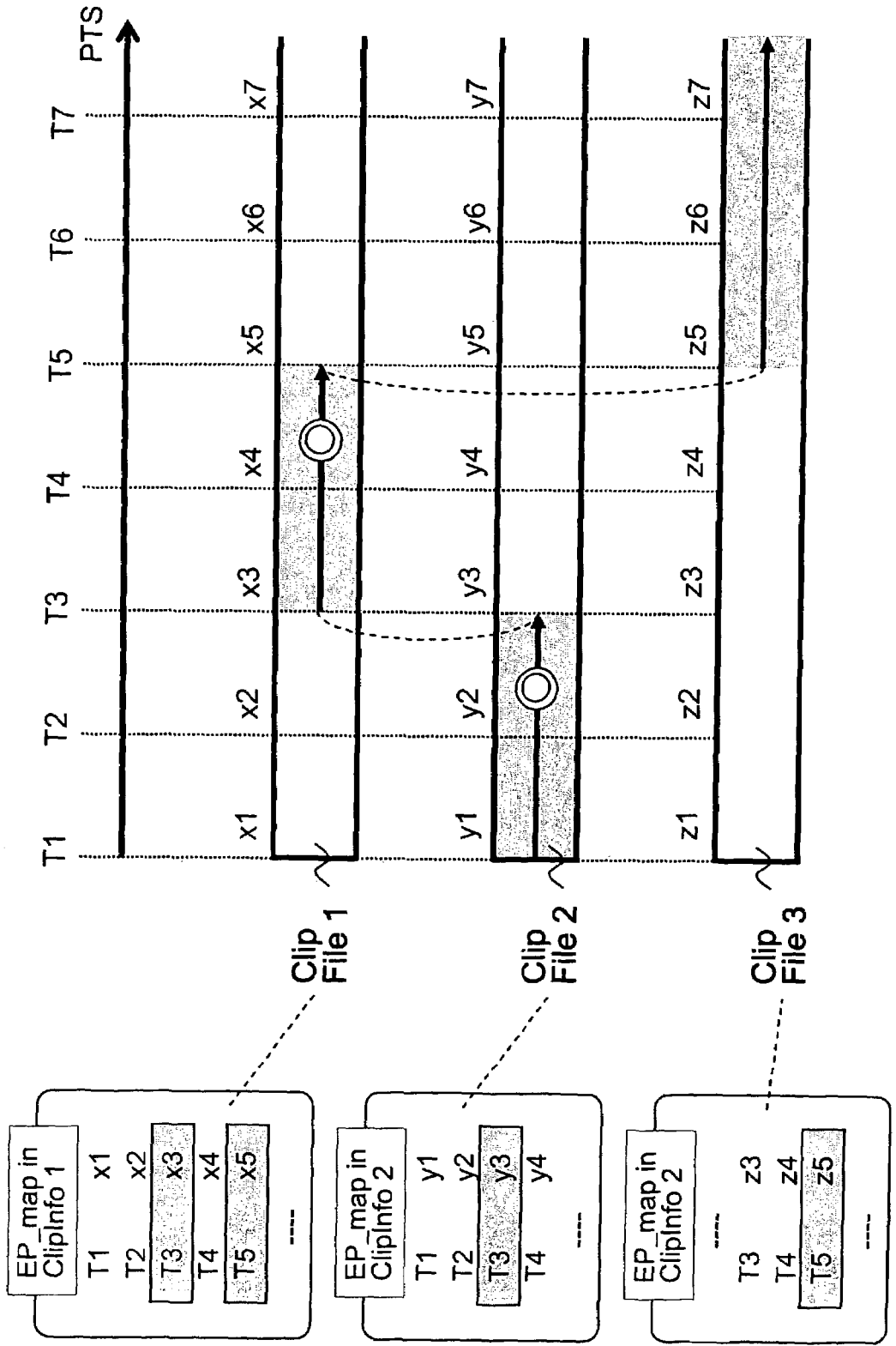
FIG. 4B illustrates the time alignment that exists between the EP maps for the different clip files.

FIG. 4B illustrates the time alignment that exists between the EP maps for the different clip files. As discussed, an EP map maps the presentation time stamp information such as indicated in a playitem to a source packet. More particularly, the presentation time stamp is mapped to the address or identifier of the source packet. The address or identifier is the source packet number (SPN). FIG. 4B further shows the source packets by source packet number along the presentation time stamp axis for each clip file 1, 2, and 3. As shown, source packets in each of the EP maps 1, 2, and 3 have the same presentation time stamps. For example, source packet x1 from the first clip file 1, source packet y1 from the second clip file 2 and source packet z1 from the third clip file 3 have the same presentation time stamp T1. As such, the EP maps 1, 2 and 3 are time-aligned. Because of this time-alignment, seamless reproduction of video data is possible even when the reproduction path is changed during reproduction. FIG. 4B illustrates changes in reproduction path by two concentric circles. As shown, if a user decides to change the reproduction path from clip file 2 to clip file 1 during reproduction of source packet y2, then after completing reproduction of source packet Y2, source packet x3 is the next source packet reproduced. Similarly if a user decides to change reproduction path (e.g., change camera angle to view) from clip file 1 to clip file 3 during reproduction of source packet x4, then after completing reproduction of source packet x4, source packet z5 is reproduced. It will be understood that the source packet numbers given in the example above are merely exemplary, and that a source packet in one clip file will not, generally, have the same source packet number as a time aligned source packet in another clip file.

FIG. 5 illustrates a portion of the general information file info.dvp according to an embodiment of the present invention. As shown, the general information file info.dvp includes an information field called 'TableOfPlaylists'. The playlist table 'TableOfPlaylists' indicates the length of the information field, and the number of playlists in the PLAYLIST directory. For each playlist, the playlist table 'TableOfPlaylists' indicates the file name 'PlayList_file_name' of the playlist (which identifies the playlist) and a path number 'Path_number'. The path number 'Path_number' provides path management information by indicating the path or paths to which the associated playlist belongs. In the embodiment of FIGS. 4A-4B, one clip corresponds to each path. Accordingly, each playlist file includes one playitem, which points to the one clip associated with the same path as the playlist file. It should be understood, however, that the present invention is not limited to this structure.

In another exemplary embodiment of the present invention, the playlist table 'TableOfPlaylists' does not include path management information. In this embodiment, illustrated in FIG. 6, the path management information is provided in the playlist files. As shown, each playlist file indicates a length of the file, and the number of playitems 'number_of_Playitems' forming the playlist. For each playitem, a playitem information field is provided in the playlist file. Here, each playitem is identified by the number of the playitem. As shown in FIG. 6, the playitem information field includes, in part, an indication of the field's length and a path number 'Path_number'. The path number 'Path_number' provides the path management information by indicating the path to which the associated playitem belongs.

Figure 7:
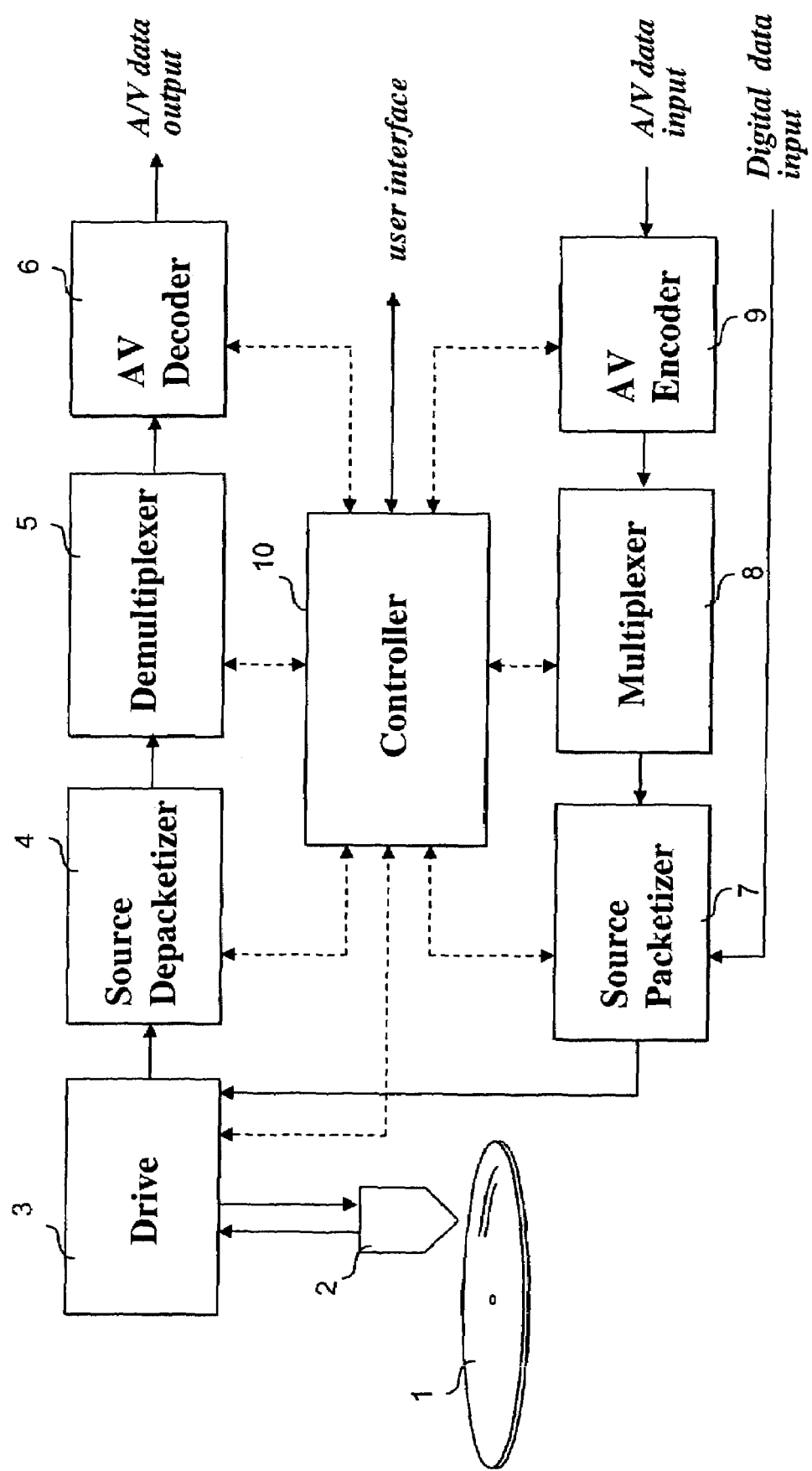
FIG. 7 illustrates a schematic diagram of an embodiment of an optical disk recording and reproduction apparatus of the present invention.

FIG. 7 illustrates a schematic diagram of an embodiment of an optical disk recording and reproducing apparatus according to the present invention. As shown, an AV encoder 9 receives and encodes audio and video data. The AV encoder 9 outputs the encoded audio and video data along with coding information and stream attribute information. A multiplexer 8 multiplexes the encoded audio and video data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the path management information for managing reproduction of the audio/video data being recorded on the optical disk. For example, based on information received via the user interface (e.g., instruction set saved on disk, provided over an intranet or internet by a computer system, etc.) the controller 10 controls the drive 3 to record the data structure of FIGS. 2, 4 and 5 or 6 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. For example, the user input may specify a path to reproduce. This user input may be specified, for example, via a menu based graphical user interface preprogrammed into the controller 10. Using the user input and the path management information reproduced from the optical disk, the controller 10 controls the reproduction of the specified path.

For example, to select a particular path, the path numbers for each playlist are examined by the controller 10 to determine the number of reproduction paths, and the user is requested which path to reproduce. The path management information may be augmented to provide more meaningful information regarding the reproduction path to reproduce. During reproduction, the EP map for the selected path is accessed to perform reproduction. And, as discussed above, if the user changes the reproduction path during reproduction, a seamless change takes place by using the EP map of the new reproduction path that is aligned in time with the EP map of the old reproduction path.

The reproduced source packets are received by a source depacketizer 4 and converted into a data stream (e.g., an MPEG-2 transport packet stream). A demultiplexer 5 demultiplexes the data stream into encoded video and audio data. An AV decoder 6 decodes the encoded video and audio data to produce the original audio and video data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 7 has been described as a recording and reproducing apparatus, it will be understood that only a recording or only a reproducing apparatus may be provided using those portions of FIG. 7 providing the recording or reproducing function.

Figure 8:
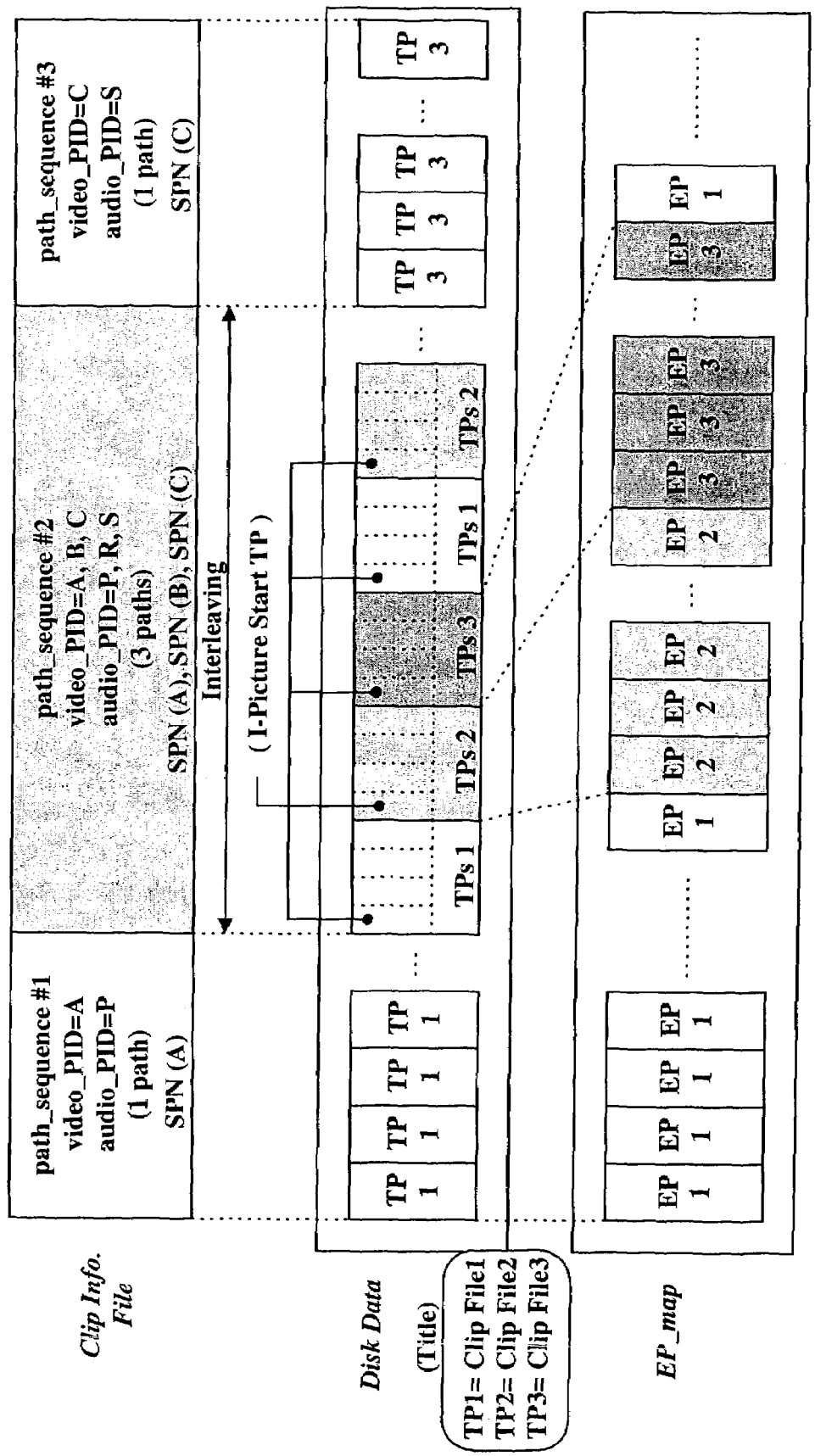
FIG. 8 illustrates a second detailed embodiment of the clip files, disk data and EP map for use in the data structure according to FIG. 2.

FIG. 8 illustrates a second detailed embodiment of the clip files, disk data and EP map for use in the data structure according to FIG. 2. As explained before, a multi-path data stream recorded in a physical data recording area, for example, of the BD-ROM may be managed as a plurality of clip files. For example, clip files 1-3 shown in FIG. 8 correspond to a title and the A/V streams recorded in the clip files are in the form of MPEG2-formatted transport packets (TPs).

The TPs (TP1) of clip file 1 corresponding to Path 1 include the information that Video_PID=A and Audio_PID=P and the TPs (TP2) of clip file 2 corresponding to Path 2 include the information that Video_PID=B and Audio_PID=R. Likewise, the TPs (TP3) of clip file 3 corresponding to Path 3 include the information that Video_PID=C and Audio_PID=S. The TPs of the clip files 1, 2, and 3 corresponding to Paths 1, 2, and 3 respectively are recorded in the AV stream area within the physical data recording area of the recording medium (e.g., BD-ROM) in an interleaved manner. As mentioned before, the different paths may, in one exemplary embodiment be different camera angles.

The TPs for multiple reproduction paths are interleaved as interleave blocks each of which contains at least one I-picture. And the first transport packet of each interleave block is the first transport packet of an I-picture.

The path management information for playback control of the single-path and multi-path A/V streams recorded as a single title in the physical data recording area of the BD-ROM may be recorded in a clip information file corresponding to the clip files, as depicted in FIG. 8.

For example, the path management information is recorded and managed as path sequence information in a clip information file corresponding to the clip files 1, 2, and 3. The path sequence information includes the path sequence numbers (Path_Sequence Numbers) corresponding to the recording segments, for example, recording segments 1, 2, and 3 and video/audio PIDs (Video_PIDs and Audio_PIDs).

In more detail, Path_Sequence #1, corresponding to a first recording segment, includes the information that 'Video_PID=A' and 'Audio_PID=P', which indicates that this recording segment only includes video data for the first reproduction path. Path_Sequence #2, corresponding to the second recording segment, includes the information that 'Video_PID=A, B, C' and 'Audio_PID=P, R, S', which indicates that this segment of video data includes video data for the first, the second, and the third reproduction paths. Path Sequence #3, corresponding to a third recording segment, includes the information that 'Video_PID=C' and 'Audio_PID=S', which indicates that the video data in this recording segment includes video data for only the third reproduction path.

Each path sequence also includes a source packet number SPN for each reproduction path in the path sequence. The SPN for a reproduction path is the first source packet for that reproduction path in that path sequence.

A path sequence may correspond to video data segment having one or more of the reproduction paths included therein. Also, the number of path sequences is not limited to three.

In addition to the path sequence information, FIG. 8 shows that the clip information files for the clip files 1, 2, and 3, provide the same search information for selectively accessing TPs of each path recorded in the first through third segments. For example, the same EP map is provided by clip information files. When the EP map information recorded in the clip information files is managed as a single EP map, the PTSs and SPNs of TPs of the different reproduction paths are recorded in the EP map by interleaving in the same order that the TPs of the different reproduction paths are recorded.

Alternatively, as shown with respect to FIGS. 4A and 4B, a one-to-one correspondence may exist between EP maps and reproduction paths. In the case of FIG. 8, three EP maps (EP_map 1, 2, 3) corresponding to the groups of TPs of paths 1, 2, 3 respectively would be created and recorded in the clip information file.

As will be readily apparent, the recording and reproducing apparatus of FIG. 7 may operate in the same manner with respect to the embodiment of FIG. 8 as was described above with respect to FIGS. 4A and 4B. However, it will be appreciated that other methods of reproduction are also possible and the present invention is not limited to this one example. For instance, path management information in the form of the path sequence information in the clip information files may be reproduced and used to manage the reproduction of multiple reproduction path video data. Here, the PIDs in each path sequence are examined to determine the number of reproduction paths. The user is then requested to select a path. If a single EP map is provided, the controller 10 uses the EP map and the PID of the selected path to reproduce the appropriate clip file for the selected reproduction path. If an EP map for each reproduction path is provided, then the EP map corresponding to the selected reproduction path is used to reproduce the clip file for the selected reproduction path. And, as discussed above, if the user changes the reproduction path during reproduction, a seamless change takes place by using the EP map of the new reproduction path that is aligned in time with the EP map of the old reproduction path.

As will be appreciated from the forgoing disclosure, the present invention provides a recording medium having a file or data structure that permits managing the reproduction of video data on a multiple reproduction path basis. Accordingly, the present invention provides a greater level of flexibility in the reproduction of video data than previously available.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. An optical disk storing a data structure for managing reproduction, by a reproducing apparatus, of at least video data having multiple reproduction paths, comprising:
    at least one data directory storing more than one clip of video data for at least one segment of a title, each clip associated with a different one of the multiple reproduction paths of the segment; and
    at least one data base directory, separated from the at least one data directory, storing a first management file and more than one second management files for managing reproduction of the video data by the reproducing apparatus, the first management file and the second management files being separate from the clips, the first management file including information indicating at least one playing interval in at least one of the clips for the reproducing apparatus to reproduce, and each second management file being associated with one of the clips and including management information for the associated one of the clips,
    wherein the first management file indicates reproduction paths of the multiple reproduction paths of the segment in one title, and
    wherein the second management files each include at least one entry point map identifying a presentation time and an address of the video data for the one of the clips associated with the second management file, and the at least one entry point map includes path change information related to changing reproduction paths.

2. The recording medium of claim 1, wherein each reproduction path is a different camera angle for the segment.

3. The recording medium of claim 1, wherein the information in the first management file includes a playitem indicating a playing interval in the video data, and the multiple reproduction paths of the segment being associated with one playitem.

4. The recording computer readable medium of claim 3, wherein the entry point maps are aligned in time.

5. The recording medium of claim 3, wherein the video data are recorded as video data packets and each video data packet has a packet number that differentiates one video data packet from another; and
    each entry point map identifies the video data in the segment by identifying the packet numbers of the video data packets.

6. The recording medium of claim 1, wherein
the video data are recorded as video data packets and each video data packet has a packet number that differentiates one video data packet from another; and
each entry point map identifies the video data in the segment by identifying the packet numbers of the video data packets.

7. The recording medium of claim 1, wherein the video data are recorded as video data packets and at least a portion of the video data packets associated with different reproduction paths for the segment are interleaved.

8. The recording medium of claim 7, wherein the video data packets associated with each reproduction path for the segment are recorded as one or more groups, and the groups are interleaved.

9. The recording medium of claim 8, wherein each group of video data packets represents at least an intra-coded picture.

10. The recording medium of claim 8, wherein a first video data packet in each group is a start of an intra-coded picture.

11. An optical disk storing a data structure for managing reproduction, by a reproducing apparatus, of at least video data having multiple reproduction paths, comprising:
at least one data directory storing at least one clip of video data for at least one segment of a title, each clip being associated with a different one of the multiple reproduction paths, each reproduction path for the segment being recorded as one or more groups, and the groups being interleaved; and
at least one data base directory, separated from the at least one data directory, storing a first management file and more than one second management files for managing reproduction of the video data by the reproducing apparatus, the first management file and the second management files being separate from the clips, the first management file including information indicating at least one playing interval in the segment for the reproducing apparatus to reproduce and each second management file being associated with one of the clips and including management information for an associated one of the reproduction paths,
wherein the first management file indicates reproduction paths of the multiple reproduction paths of the segment in one title, and
wherein the second management files each include at least one entry point map identifying a presentation time and an address of the video data for the one of the clips associated with the second management file, such that the at least one entry point map is associated with one of the clips and the at least one entry point map includes path change information related to changing reproduction paths.

12. A method of recording a data structure for managing reproduction of at least video data having multiple reproduction paths on a recording medium, comprising:
recording more than one clip of video data for at least one segment of a title in at least one data directory of the recording medium, each clip associated with a different one of the multiple reproduction paths; and
recording a first management file and more than one second management files in at least one data base directory of the recording medium, the at least one data base directory separated from the at least one data directory, the first management file and the second management files being separate from the clips, the first management file including information indicating at least one playing interval in at least one of the clips, and each second management file being associated with one of the clips and including management information for the associated one of the clips,
wherein the first management file indicates reproduction paths of the multiple reproduction paths of the segment in one title, and
wherein the second management files each include at least one entry point map identifying a presentation time and an address of the video data for the one of the clips associated with the second management file, and the at least one entry point map includes path change information related to changing reproduction paths.

13. A method of reproducing a data structure for managing reproduction of at least video data having multiple reproduction paths recorded on a recording medium, comprising:
reading at least one clip of video data for at least one segment of a title from at least one data directory of the recording medium, the segment being associated with more than one clip and each clip associated with a different one of the multiple reproduction paths; and
reading a first management file and more than one second management files from at least one data base directory of the recording medium, the at least one data base directory separated from the at least one data directory, the first management file and the second management files being separate from the clips, the first management file including information indicating at least one playing interval in at least one of the clips, and each second management file being associated with one of the clips and including management information for the associated one of the clips,
wherein the first management file indicates reproduction paths of the multiple reproduction paths of the segment in one title, and
wherein the second management files each include at least one entry point map identifying a presentation time and an address of the video data for the one of the clips associated with the second management file, and the at least one entry point map includes path change information related to changing reproduction paths.

14. An apparatus for recording a data structure for managing reproduction of at least video data having multiple reproduction paths on a recording medium, comprising:
a recording unit configured to record data on the recording medium; and
a controller, operably coupled to the recording unit, configured to control the recording unit to record more than one clip of video data for at least one segment of a title in at least one data directory of the recording medium, each clip associated with a different one of the multiple reproduction paths; and
the controller configured to control the optical recording unit to record a first management file and more than one second management files in at least one data base directory of the recording medium, the at least one data base directory separated from the at least one data directory, the first management file and the second management files being separate from the clips, the first management file including information indicating at least one playing interval in at least one of the clips, and each second management file being associated with one of the clips and including management information for the associated one of the clips,
wherein the first management file indicates reproduction paths of the multiple reproduction paths of the segment in one title, and wherein the second management files each include at least one entry point map identifying a presentation time and an address of the video data for the one of the clips associated with the second management file, and the at least one entry point map includes path change information related to changing reproduction paths.

15. An apparatus for reproducing a data structure for managing reproduction of at least video data having multiple reproduction paths recorded on a recording medium, comprising:

a reproducing unit to reproduce data recorded on the recording medium;

a controller, operably coupled to the reproducing unit, configured to control the reproducing unit to read a first management file and more than one second management files from at least one data base directory of the recording medium, and to control the reproducing unit to reproduce at least one clip of video data for at least one segment of a title based on the read first management file and second management files from the at least one data directory of the recording medium, the at least one data directory separated from the at least one data base directory, wherein the first management file and the second management files are separate from the clip, wherein the segment is associated with more than one clip and each clip is associated with a different one of the multiple reproduction paths; and wherein the first management file includes information indicating at least one playing interval in at least one of the clips, and each second management file is associated with one of the clips and includes management information for the associated one of the clips, wherein the first management file indicates reproduction paths of the multiple reproduction paths of the segment in one title, and wherein the second management files each include at least one entry point map identifying a presentation time and an address of the video data for the one of the clips associated with the second management file, and the at least one entry point map includes path change information related with changing reproduction paths.

16. The method of claim 12, wherein the information in the first management file includes a playitem indicating playing interval in the video data, and the multiple reproduction paths of the segment being associated with one playitem.

17. The method of claim 12, wherein the video data are recorded as video data packets and each video data packet has a packet number that differentiates one video data packet from another; and each entry point map identifies the video data in the segment by identifying the packet numbers of the video data packets.

18. The method of claim 12, wherein the video data are recorded as video data packets and at least a portion of the video data packets associated with different reproduction paths for the segment are interleaved.

19. The method of claim 18, wherein the video data packets associated with each reproduction path for the segment are recorded as one or more groups, and the groups are interleaved.

20. The method of claim 13, wherein the information in the first management file includes a playitem indicating playing interval in the video data, and the multiple reproduction paths of the segment being associated with one playitem.

21. The method of claim 13, wherein the video data are recorded as video data packets and each video data packet has a packet number that differentiates one video data packet from another; and each entry point map identifies the video data in the segment by identifying the packet numbers of the video data packets.

22. The method of claim 13, wherein the video data are recorded as video data packets and at least a portion of the video data packets associated with different reproduction paths for the segment are interleaved.

23. The method of claim 22, wherein the video data packets associated with each reproduction path for the segment are recorded as one or more groups, and the groups are interleaved.

24. The apparatus of claim 14, wherein the information in the first management file includes a playitem indicating playing interval in the video data, and the multiple reproduction paths of the segment being associated with one playitem.

25. The apparatus of claim 14, wherein the video data are recorded as video data packets and each video data packet has a packet number that differentiates one video data packet from another; and each entry point map identifies the video data in the segment by identifying the packet numbers of the video data packets.

26. The apparatus of claim 14, wherein the video data are recorded as video data packets and at least a portion of the video data packets associated with different reproduction paths for the segment are interleaved.

27. The apparatus of claim 26, wherein the video data packets associated with each reproduction path for the segment are recorded as one or more groups, and the groups are interleaved.

28. The apparatus of claim 15, wherein the information in the first management file includes a playitem indicating playing interval in the video data, and the multiple reproduction paths of the segment being associated with one playitem.

29. The apparatus of claim 15, wherein the video data are recorded as video data packets and each video data packet has a packet number that differentiates one video data packet from another; and each entry point map identifies the video data in the segment by identifying the packet numbers of the video data packets.

30. The apparatus of claim 15, wherein the video data are recorded as video data packets and at least a portion of the video data packets associated with different reproduction paths for the segment are interleaved.

31. The apparatus of claim 30, wherein the video data packets associated with each reproduction path for the segment are recorded as one or more group, and the groups are interleaved.

32. The apparatus of claim 14, further comprising:
an encoder configured to encode at least video data having multiple reproduction paths,
wherein the recording unit includes a pickup configured to record the data on the recording medium.

33. The apparatus of claim 15, wherein the reproducing unit includes a pickup configured to read at least one of the first management file, the second management files, and at least one clip of video data.

* * * * *